Figure 1:
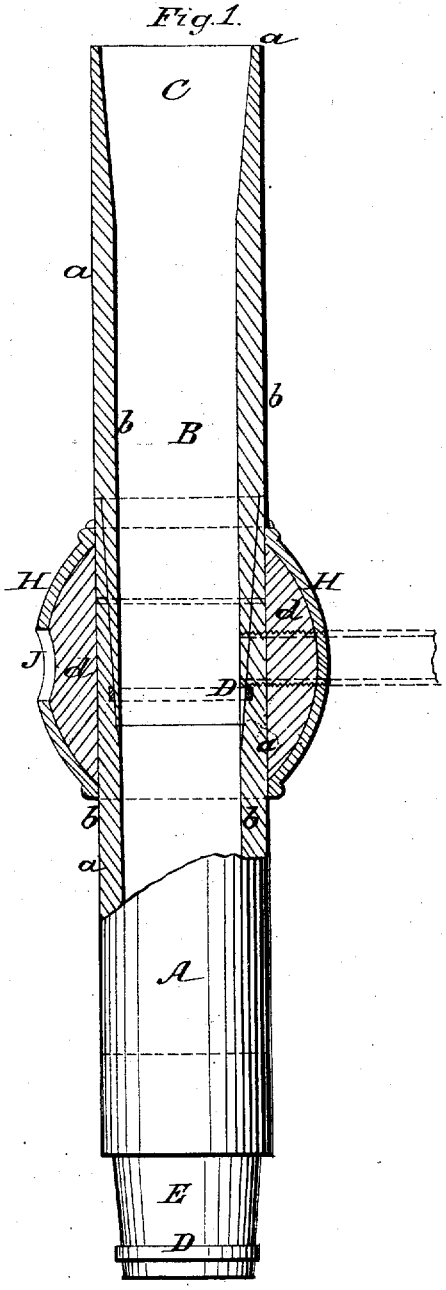

E. Dayton,

Pipe Coupling.

No. 3824. Reissued Feb. 8. 1870.

Witnesses.

Jamo. M. Smith

E. A. Smith

Inventor:

Edwin Dayton by Attys

Sanford and Prescott

N. PETERS, PHOTO-LITHOGRAPHER, WASHINGTON, D. C.

United States Patent Office.

EDWIN DAYTON, OF MERIDEN, CONNECTICUT.

*Letters Patent No.* 77,465, *dated May* 5, 1868; *reissue No.* 3,824, *dated February* 8, 1870.

IMPROVEMENT IN CEMENT WATER-PIPES

The Schedule referred to in these Letters Patent and making part of the same

*To all whom it may concern:*

Be it known that I, EDWIN DAYTON, of Meriden, in the county of New Haven, State of Connecticut, have invented a new and useful Improvement in Water-Pipe Joints and Tapping-Device; and I do hereby declare that the following is a full and exact description of the same, reference being had to the accompanying drawings, and to the letters of reference marked thereon.

Figure 1, a side view and partial section of two lengths of pipe jointed or held together by my improvement.

My invention relates to the manner of jointing or coupling together the ends of water-pipes commonly called cement water-pipes, which are formed of sheet-metal and lined or coated upon the inside, or upon the inside and outside with cement, such as is ordinarily used for these purposes.

My inventiontion consists in tapering the end of one pipe-section upon its inside for a certain portion of its length, and so forming or tapering the end of the other section upon the outside as to fit within the inside tapered end, and thus produce a pipe which, after having been jointed, will be of an even and uniform diameter, both upon its inside and outside.

The two pipe-sections thus jointed are permanently secured together by cementing the joint or by using a collar, ring, or thimble placed over and around the said joint and cemented thereto.

The method I prefer to use, and which forms a part of my invention, consists of a metallic collar, spun or curved downward at each end, but sufficiently large to allow of its sliding freely upon the pipe, and provided with one or more holes upon its side for filling the space between it and the surface of the pipe with cement. The advantage of this arrangement over common ring or thimble is, that by making a collar which is comparatively tight at each end, and forcing the cement into it from the side, the whole aperture will be filled without a chance of leaving an air-hole, and the cement, by a required amount of pressure, can be forced around the joint and made much more solid than can possibly be done by pressing it in and around the pipe from the ends of the ring, as is commonly done.

To enable others skilled in the art to make and use my invention, I will proceed to describe the same, with reference to the accompanying drawings.

A and B are the two sections or length of pipe, in which *a* is the sheet-metal tube, lined or coated upon its inside with cement *b*, suitable for the purpose.

One end of each of the sections A and B of the pipe is made of tapering-shape upon its inner surface, inclining from its end inward toward the centre, as shown at C in the drawing.

The other end of each pipe-section is made of conical or tapering shape upon the outside, as shown at E, with an incline corresponding to the inside taper of the opposite end, so as to nicely fit therein and form an even, smooth, and uniform bore, and as the conical end of one section comes to a stop with its shoulder against the end of the inside tapered section, the pipe, when thus united, is even and uniform in its external diameter.

Instead of tapering the ends of the tube in each section, I prefer to unite them by means of a short pipe, E, resembling a truncated cone, the base of which is inserted in one section and held in place by the cement lining, a part of which will be above and a part below it.

D is a packing-ring, formed of rubber or other suitable material, placed upon or around the tapering or conical end of the pipe-section, which, as the two sections are placed together, is forced between the incline surfaces, thus producing, in plastic material, a close, tight joint.

The collar H is made in the form shown in the figure, with its ends fitting so closely upon the surface of the pipe that the cement, when prepared in the usual way, cannot escape, and besides securing the joint, the said collar thus holds the pipe in an even and perfect line.

The collar H is provided with an aperture, J, upon its side for the purpose of filling with cement, or other suitable substance, the space *d* between the collar and pipe.

Wherever it is necessary to tap the pipe, either at the joint or elsewhere, a collar similar to one described may be placed, and, after being filled with cement, the pipe may be tapped through the collar, (as shown in red in the drawing,) which holds the branch in a firm and reliable manner.

I do not broadly claim an outer connection for water-pipes, as such is not new. Neither do I claim a socket-joint made by enlarging the end of the pipe; but What I do claim as new and useful, and desire to secure by Letters Patent, is—

1. The joint of a cement-lined taper water-pipe, formed by correspondingly tapering the ends of the separate sections, so that when closed they may form a pipe of uniform diameter, substantially as shown and described.

2. The short pipe E, of tapering shape, fitting into the adjoining ends of the pipes A and B, to form a water-tight joint and coated equally upon the under and outer sides with cement, as shown and described.

3. The packing-ring or band D, applied to pipe-sections previous to the application of the cement, substantially in the manner and for the purpose as herein shown and described.

This specification signed and witnessed this 31st day of July, 1869.

EDWIN DAYTON.

Witnesses:
GEO. W. SMITH,
RUFUS H. SANFORD.